United States Patent
Takayanagi (10) Patent No.: US 10,450,789 B2
(45) Date of Patent: Oct. 22, 2019

(54) VEHICLE OPERATION DETECTING DEVICE

(71) Applicant: AISIN SEIKI KABUSHIKI KAISHA, Kariya-shi, Aichi-ken (JP)

(72) Inventor: Hitoshi Takayanagi, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 361 days.

(21) Appl. No.: 15/427,690

(22) Filed: Feb. 8, 2017

(65) Prior Publication Data

US 2017/0241187 A1  Aug. 24, 2017

(30) Foreign Application Priority Data

Feb. 24, 2016  (JP) .................. 2016-033458

(51) Int. Cl.
  *E05F 15/75*  (2015.01)
  *E05F 15/632*  (2015.01)
  *B60R 25/20*  (2013.01)
  *E05F 15/73*  (2015.01)

(52) U.S. Cl.
  CPC .......... *E05F 15/75* (2015.01); *B60R 25/2045* (2013.01); *E05F 15/632* (2015.01); *E05F 15/73* (2015.01); *E05F 2015/765* (2015.01); *E05Y 2400/32* (2013.01); *E05Y 2400/36* (2013.01); *E05Y 2400/44* (2013.01); *E05Y 2400/45* (2013.01); *E05Y 2400/86* (2013.01); *E05Y 2900/531* (2013.01)

(58) Field of Classification Search
  CPC ......... E05F 15/75; E05F 15/632; E05F 15/73; B60R 25/2045
  See application file for complete search history.

(56) References Cited

U.S. PATENT DOCUMENTS

2016/0265263 A1* 9/2016 Motoki ................. E05F 15/73

FOREIGN PATENT DOCUMENTS

JP  2005-307692 A  11/2005
JP  2009-18655 A  1/2009

* cited by examiner

*Primary Examiner* — Michael D Lang
(74) *Attorney, Agent, or Firm* — Sughrue Mion, PLLC (57) ABSTRACT

A vehicle operation detecting device includes: a plurality of sensors that are arranged side by side in a vehicle and individually output a plurality of detection signals changing as a detection target touches or approaches the sensors; a peak position detector that detects a plurality of peak positions of the plurality of detection signals; an operation direction detector that detects a moving direction of the detection target in an arrangement direction of the plurality of sensors, based on an order of the plurality of peak positions; and a driving controller that controls a driving of an opening/closing member according to the detected moving direction.

10 Claims, 8 Drawing Sheets

VEHICLE OPERATION DETECTING DEVICE

CROSS REFERENCE TO RELATED APPLICATIONS

This application is based on and claims priority under 35 U.S.C. § 119 to Japanese Patent Application 2016-033458, filed on Feb. 24, 2016, the entire contents of which are incorporated herein by reference.

TECHNICAL FIELD

This disclosure relates to a vehicle operation detecting device which detects an operation for an opening/closing member.

BACKGROUND DISCUSSION

As the vehicle operation detecting device, there has been conventionally known, for example, a vehicle power backdoor automatic opening/closing system disclosed in Japanese Patent Laid-Open Publication No. 2005-307692 (Reference 1) or a control device and method disclosed in Japanese Patent Laid-Open Publication No. 2009-18655 (Reference 2).

In Reference 1, a user's gesture of touching an electrostatic capacitance type sensor provided in a vehicle with a part of the user's body (e.g., a hand) is a gesture of requesting opening/closing of a backdoor. Specifically, the sensor includes two touch sensors, and is configured such that an operation direction requested for the backdoor is determined based on, for example, an order (time difference) in which the user touches the two touch sensors.

Similarly, in Reference 2, a user's operation of keeping various objects close to or away from a predetermined place is detected (determined), and various functions of an automobile are exhibited according to a detection result.

In Reference 1, it is determined whether there is a person (user)'s gesture, based on a magnitude relationship between pulse signals correlated with the electrostatic capacitances generated/output by the respective touch sensors and a predetermined threshold. Thus, the order in which the user touches the two touch sensors is determined according to timings when the magnitude relationship between the pulse signals of the two touch sensors and the predetermined threshold is reversed. In this case, when a sensitivity difference occurs between the two touch sensors due to, for example, an influence of a product tolerance, an environmental change or the like, that is, when the sensitivities of the two touch sensors are not equal to each other, the above-described order may be erroneously determined. The problem may occur in Reference 2 as well. This point will be more specifically described below.

Figure 14:
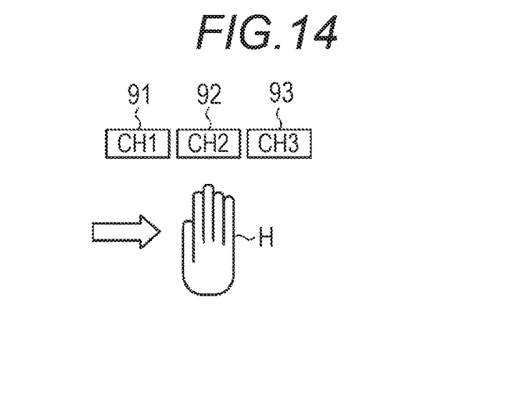
FIG. 14 is an explanatory view illustrating an operation in a conventional vehicle operation detecting device.
Figure 15A:
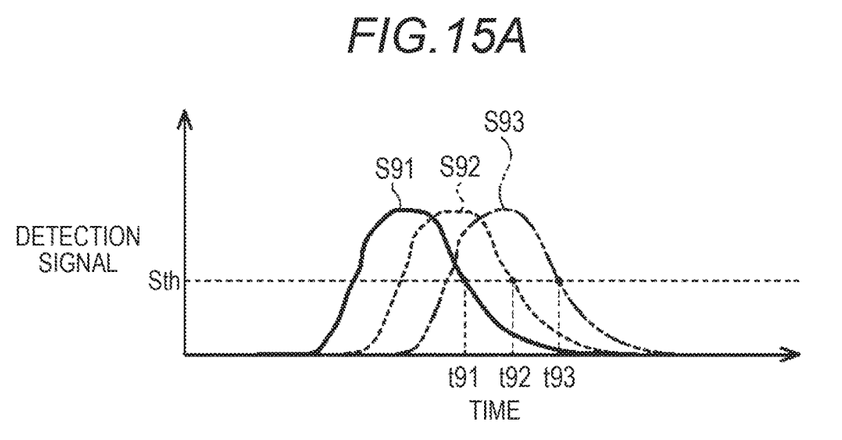
FIGS. 15A to 15C are time charts for explaining an aspect of detecting the operation in the conventional vehicle operation detecting device.
Figure 15B:
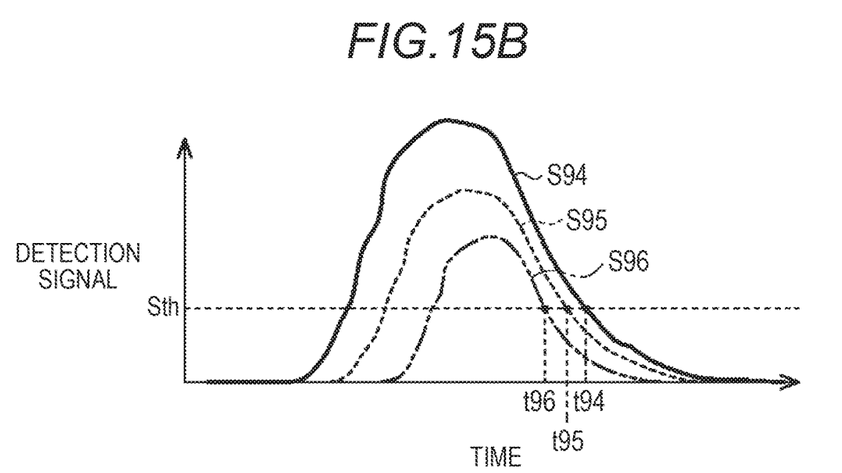
Figure 15C:
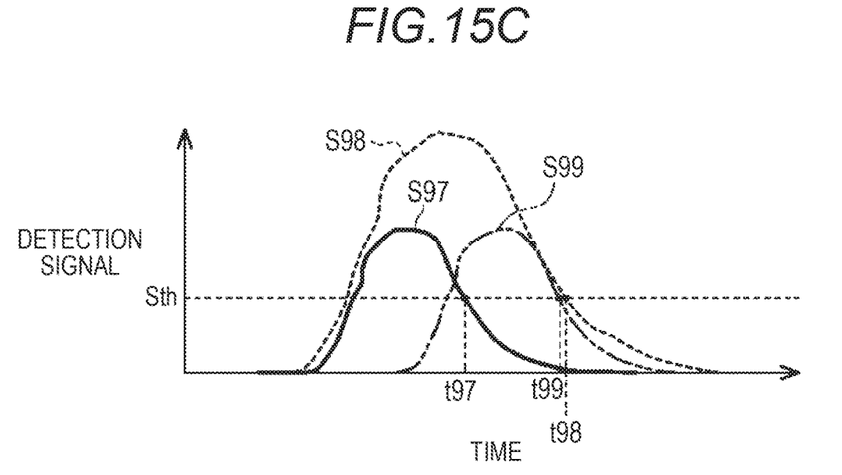

FIG. 14 illustrates a state where, in a configuration where sensor electrodes 91, 92, and 93 corresponding to three (3) touch sensors are arranged side by side, a user moves a part of the user's body (e.g., a finger H) along a direction following the order of the sensor electrodes 91, 92, and 93. FIGS. 15A to 15C illustrate changes of detection signals S91, S92, and S93 corresponding to pulse signals generated/output by the sensor electrodes 91 to 93 in accordance with the user's corresponding gesture, together with a threshold Sth for the determination of the magnitude relationship of the detection signals S91, S92, and S93.

As illustrated in FIG. 15A, when the sensitivities of the sensor electrodes 91 to 93 are equal to each other, the waveforms of the detection signals S91 to S93 are equal to each other, and the detection signals S91 to S93 are generated in this order in accordance with the user's gesture, for example. Accordingly, timing differences occur such that timings t91, t92, and t93 when the detection signals S91 to S93 drop below the threshold Sth (so-called threshold offtimings) also follow the order of the sensor electrodes 91 to 93. In other words, the user's gesture (the moving direction of the finger H of the user) is determined by monitoring the order of the timings t91, t92, and t93.

Meanwhile, as illustrated in FIG. 15B, even when the sensitivities of the sensor electrodes 91 to 93 are lowered in this order, detection signals S94, S95, and S96 are also generated in this order in accordance with the user's gesture, for example. However, for example, the detection signals may be generated such that, for example, the detection signal S94 or S95 of the sensor electrode 91 or 92 having a relatively high sensitivity includes the detection signal S95, or S96 of the sensor electrode 92 or 93 having a relatively low sensitivity. In this case, time differences occur such that the order of timings t94, t95, and t96 when the detection signals S91 to S93 drop below the threshold Sth is reverse to the original order of the sensor electrodes 91 to 93. Thus, the user's gesture (the moving direction of the finger H of the user) is determined in a reverse order to the original order.

As illustrated in FIG. 15C, when only the sensitivity of the sensor electrode 92 is higher than the sensitivities of the other sensor electrodes 91 and 93, for example, detection signals S97, S98, and S99 may be generated such that the detection signal S98 of the sensor electrode 92 includes the detection signals S97 and S99 of the other sensor electrodes 91 and 93 regardless of the user's gesture. In this case, of timings t97, t98, and t99 when the detection signals S97 to S99 drop below the threshold Sth, the timing t99 precedes the timing t98, and thus, the determination of the user's gesture (the moving direction of the finger H of the user) is disabled.

SUMMARY

Thus, a need exists for a vehicle operation detecting device which is not suspectable to the drawback mentioned above.

A vehicle operation detecting device according to an aspect of this disclosure includes: a plurality of sensors that are arranged side by side in a vehicle and individually output a plurality of detection signals changing as a detection target touches or approaches the plurality of sensors; a peak position detector that detects peak positions of the plurality of detection signals; an operation direction detector that detects a moving direction of the detection target in the arrangement direction of the plurality of sensors, based on an order of the peak positions; and a driving controller that controls a driving of an opening/closing member along the detected moving direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of a vehicle operation detecting device will be described.

Figure 1:
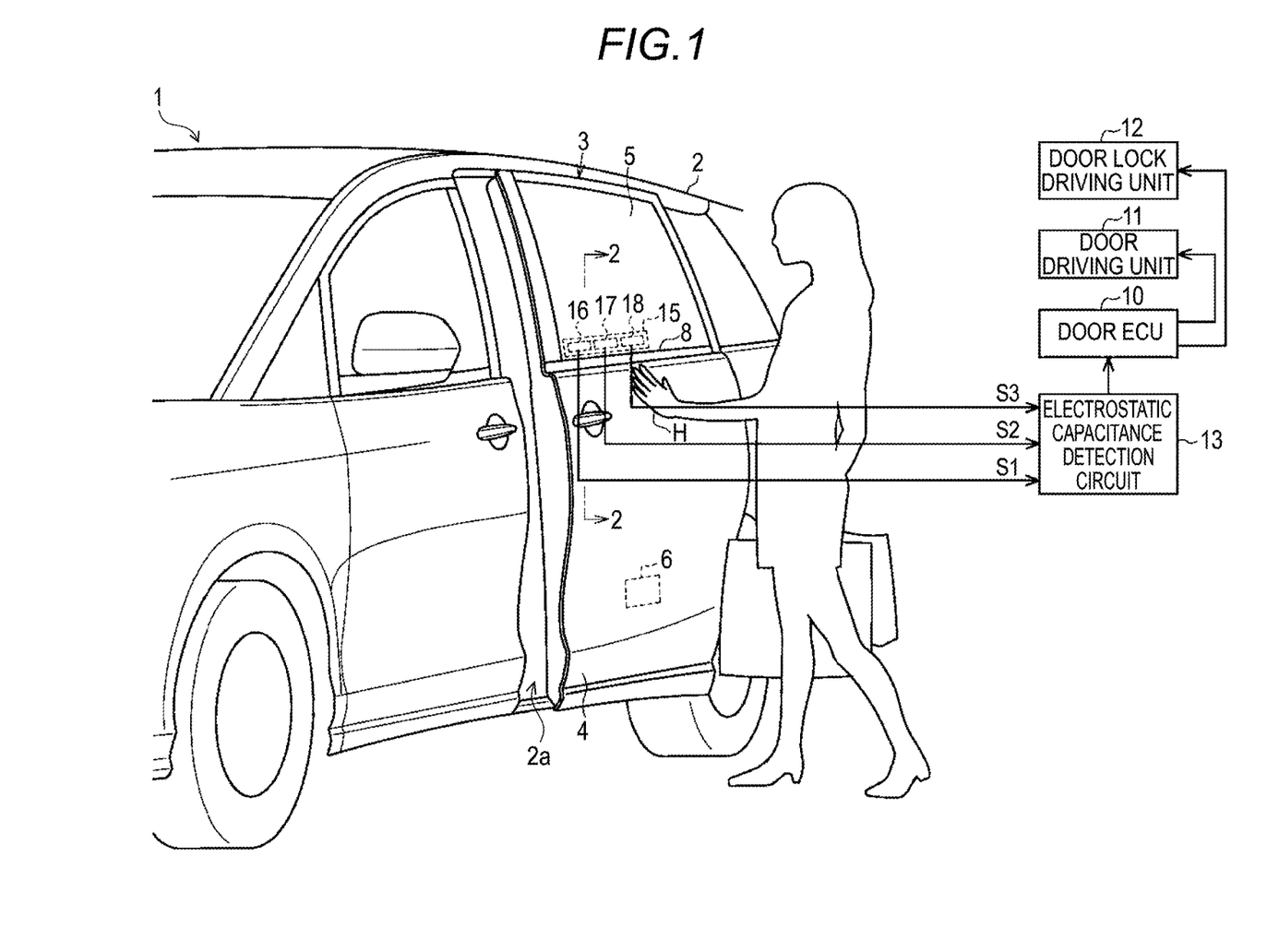
FIG. 1 is a perspective view illustrating a lateral structure of a vehicle to which an exemplary embodiment of a vehicle operation detecting device is applied.

As illustrated in FIG. 1, an opening 2a is formed on a lateral side of a body 2 of a vehicle 1 (e.g., an automobile). Further, a sliding door 3 as an opening/closing member is mounted on the lateral side of the body 2 to move forward and rearward so as to open/close the opening 2a. The sliding door 3 includes a substantially pocket shaped door panel 4 forming the lower portion of the sliding door 3 and a window glass 5 moving upward and downward from the door panel 4. In addition, the door panel 4 is provided with a door lock 6 that locks and unlocks the sliding door 3 in a closed state.

A door driving unit 11 is installed in the sliding door 3, for example, the door panel 4. The door driving unit 11 is mainly configured by an electric driving source (e.g., an electric motor), and mechanically connected to the body 2 via an appropriate door driving mechanism so as to drive the sliding door 3 to be opened/closed. Further, a door lock driving unit 12 is installed in the sliding door 3, for example, adjacent to the door lock 6. The door lock driving unit 12 is mainly configured by an electric driving source (e.g., an electric motor) and mechanically connected to the door lock 6 via an appropriate lock driving mechanism so as to drive the door lock 6 to be locked/unlocked.

Both the door driving unit 11 and the door lock driving unit 12 are electrically connected to a door electronic control unit (ECU) 10 configured by, for example, a microcomputer (MCU) and individually driven and controlled by the door ECU 10.

Figure 2:
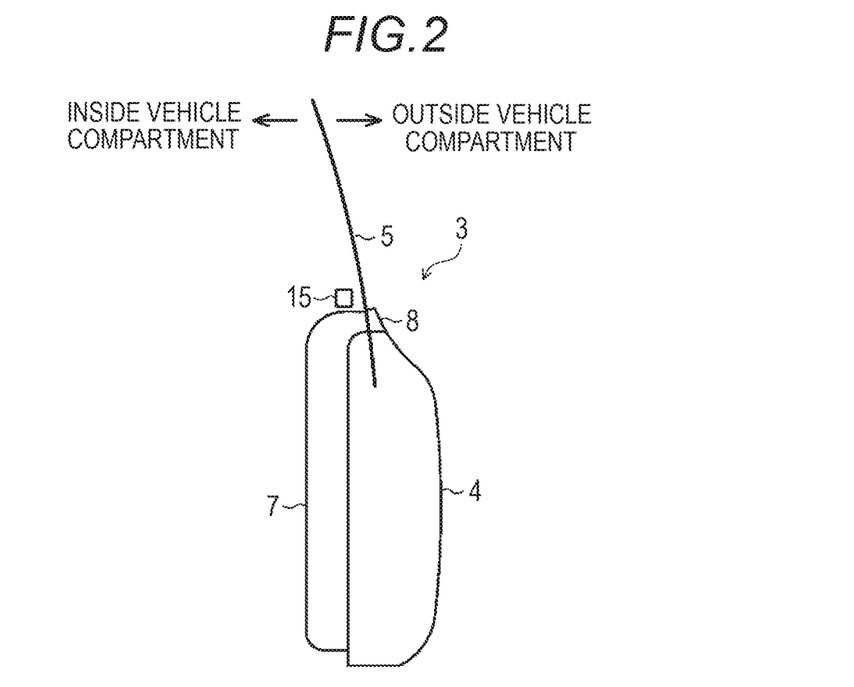
FIG. 2 is a sectional view taken along the line 2-2 of FIG. 1.
Figure 3:
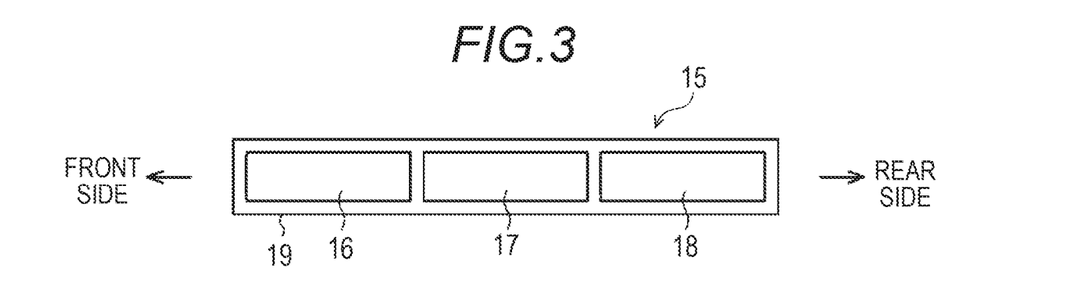
FIG. 3 is a front view illustrating a structure of the vehicle operation detecting device of the exemplary embodiment.

On the window glass 5, a substantially rectangular sensor body 15 is installed near the door panel 4. That is, as illustrated in FIG. 2, a door trim 7 is mounted on the door panel 4 to form the interior design of the vehicle compartment, and a dewatering belt molding 8 is mounted on the top end of the door panel 4 to be in sliding-contact with the vehicle compartment outer surface of the vertically moving window glass 5. The sensor body 15 is placed on the door trim 7 that is located closer to the interior of the vehicle compartment than the window glass 5. As illustrated in FIG. 3, the sensor body 15 includes a first electrode 16, a second electrode 17, and a third electrode 18 of a plurality of electrostatic capacitance sensors as sensors arranged side by side at intervals in the front and rear direction, and also includes a board 19 on which the electrodes are formed. The first to third electrodes 16 to 18 have substantially the same shape.

As illustrated in FIG. 1, the first to third electrodes 16 to 18 are electrically connected to an electrostatic capacitance detection circuit 13. The electrostatic capacitance detection circuit 13 outputs an oscillation signal to each of the first to third electrodes 16 to 18 so as to cause each of the electrodes to output a detection signal S1, S2, or S3 (V) that has a voltage level according to the electrostatic capacitance thereof. The output of the oscillation signals by the electrostatic capacitance detection circuit 13 and the input of the detection signals S1 to S3 in response to the output may be performed at the same time for all the first to third electrodes 16 to 18, or sequentially performed for the first to third electrodes 16 to 18 in this order by being switched in short time.

Figure 5:
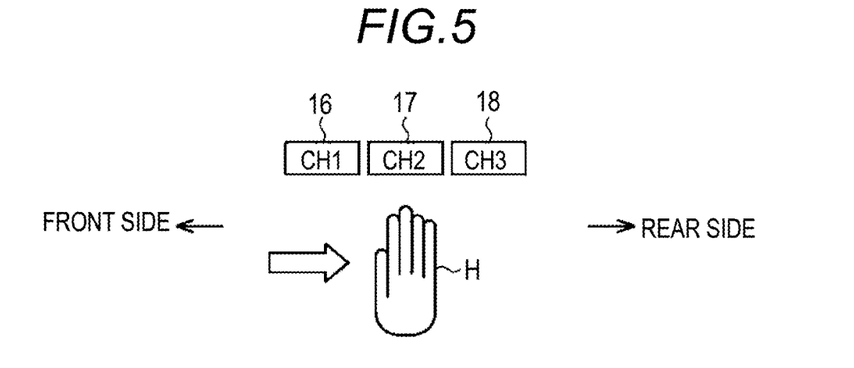
FIG. 5 is an explanatory view illustrating an operation in the vehicle operation detecting device of the exemplary embodiment.

Accordingly, the first to third electrodes 16 to 18 individually output the detection signals S1 to S3, which change as a detection target (e.g., a finger H of a person) touches or approaches the surface of the window glass 5 near the sensor body 15, to the electrostatic capacitance detection circuit 13. The electrostatic capacitance detection circuit 13 is electrically connected to the door ECU 10. In addition, in a regular operation of the present exemplary embodiment, a user (person)'s gesture of moving the finger H with respect to the window glass 5 indicates an appropriate operation to open/close the sliding door 3. That is, as illustrated in FIG. 5, for example, a gesture of moving the finger H in the front and rear direction from the first electrode 16 toward the third electrode 18 (hereinafter, also referred to as a "rearward swipe") indicates an operation to open the sliding door 3 and unlock the door lock 6 according to the opening of the sliding door 3. Alternatively, a gesture of moving the finger H in the front and rear direction from the third electrode 18 toward the first electrode 16 (hereinafter, also referred to as a "forward swipe") indicates an operation to close the sliding door 3 and lock the door lock 6 according to the closing of the sliding door 3.

Figure 4:
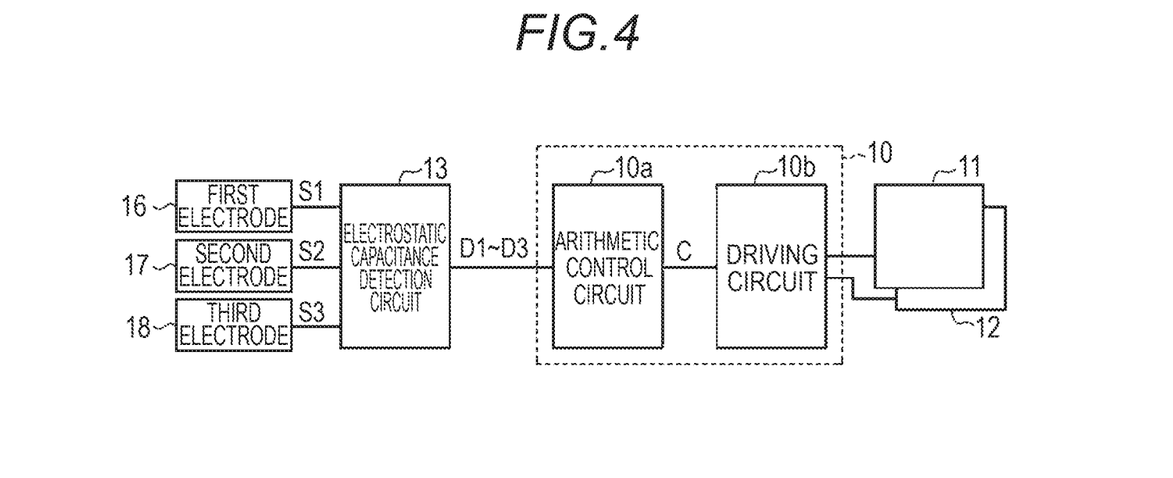
FIG. 4 is a block diagram illustrating an electrical configuration of the vehicle operation detecting device of the exemplary embodiment.

As illustrated in FIG. 4, the door ECU 10 includes an arithmetic control circuit 10a and a driving circuit 10b. In the door ECU 10, the arithmetic control circuit 10a is electrically connected to the electrostatic capacitance detection circuit 13, and the driving circuit 10b is electrically connected to the door driving unit 11 and the door lock driving unit 12. The electrostatic capacitance detection circuit 13 outputs detection data D1, D2, and D3 obtained by an analogue/digital (ND) conversion of the detection signals S1 to S3, to the arithmetic control circuit 10a.

The arithmetic control circuit 10a executes various arithmetic processes based on the detection data D1 to D3, and outputs a control signal C according to a corresponding arithmetic process result, to the driving circuit 10b. The driving circuit 10b drives the door driving unit 11 and the door lock driving unit 12 according to the control signal C.

Next, descriptions will be made on, for example, an aspect of a detection of the rearward swipe by the arithmetic control circuit 10a.

Figure 6A:
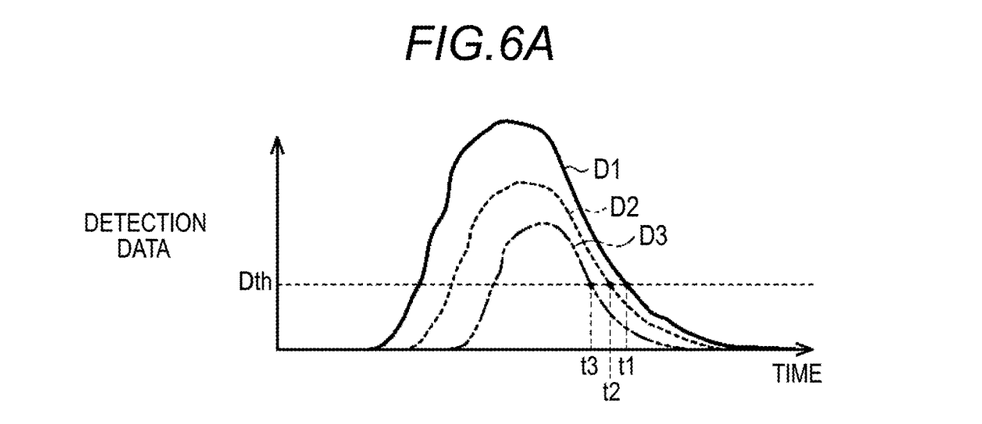
FIGS. 6A and 6B are time charts for explaining an aspect of detecting the operation in the vehicle operation detecting device of the exemplary embodiment.

As illustrated in FIG. 5, when a user keeps the finger H close to the window glass 5 and performs the rearward swipe, the finger H moves in the front and rear direction from the first electrode 16 toward the third electrode 18. Accordingly, as illustrated in FIG. 6A, for example, the first to third electrodes 16 to 18 generate the detection data D1 to D3 (the detection signals S1 to S3) in the order of the electrodes in accordance with the user's gesture. Here, for example, it is assumed that the sensitivities of the first to third electrodes 16 to 18 are lowered in this order, and, for example, the detection data D1 to D3 are generated such that the detection data D1 or D2 of the first or second 16 or 17 having a relatively high sensitivity includes the detection data D2 or D3 of the second or third electrode 17 or 18 having a relatively low sensitivity. In this case, when timings t1, t2, and t3 when the detection data D1 to D3 drop below the threshold Dth are acquired as in the conventional art, time differences occur such that the order of the timings t1, t2, and t3 is reverse to the original order of the first to third electrodes 16 to 18. Accordingly, it is natural that the user's gesture (the moving direction of the finger H of the user) is detected in a reverse direction to the original direction.

Thus, in the present exemplary embodiment, the arithmetic control circuit 10a detects peak positions of the respective detection data D1 to D3 (a peak position detector). This is because, even though the sensitivity difference occurs among the first to third electrodes 16 to 18, the detection data D1 to D3 of the first to third electrodes 16 to 18 generally tend to become the largest when the finger H is placed in front of the electrodes. In other words, the order of timings when the detection data D1 to D3 of the first to third electrodes 16 to 18 become the largest (i.e., peak positions) is consistent with the order of the first to third electrodes 16 to 18 in front of which the finger H is placed.

Figure 6B:
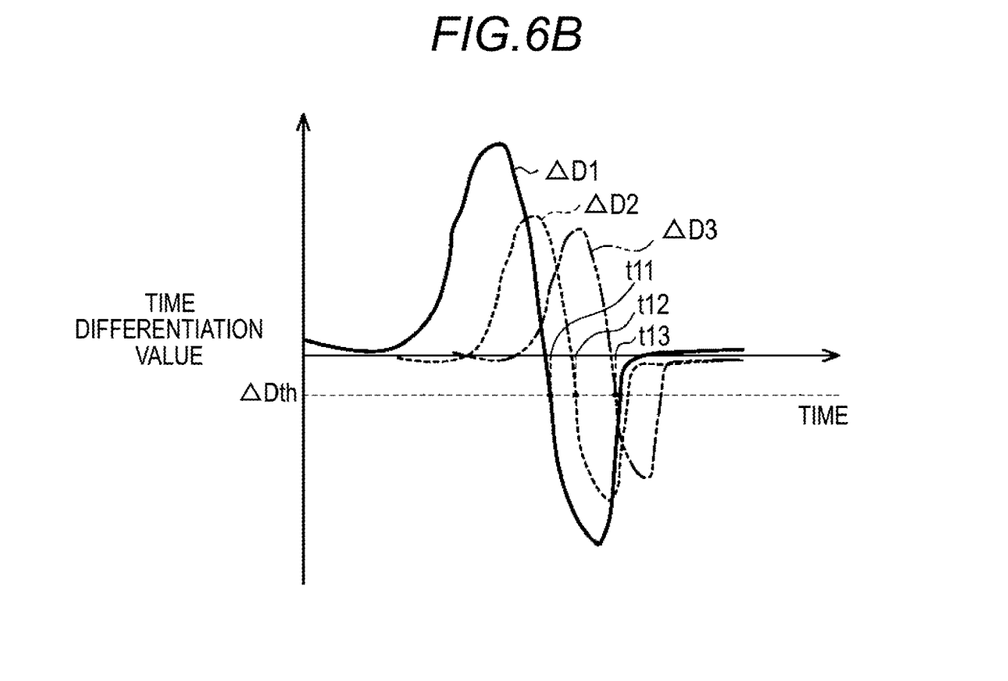

More specifically, as illustrated in FIG. 6B, the arithmetic control circuit 10a detects the peak positions by calculating time differentiation values ΔD1, ΔD2, and ΔD3 of the respective detection data D1 to D3. This is attributed to the perception that since the peak positions of the detection data D1 to D3 have extreme values, the time differentiation values ΔD1 to ΔD3 change from positive numbers into negative numbers before and after the peak positions.

That is, the arithmetic control circuit 10a detects the timings when the time differentiation values ΔD1 to ΔD3 of the plurality of respective detection data D1 to D3 are negative values and drop below a predetermined peak position determination threshold ΔDth, as the peak positions. Accordingly, the arithmetic control circuit 10a detects timings t11, t12, and t13 when the time differentiation values ΔD1 to ΔD3 drop below the peak position determination threshold ΔDth, as the peak positions of the detection data D1 to D3. In this case, the order of the timings t11, t12, and t13 (i.e., the peak positions) is consistent with the order of the first to third electrodes 16 to 18 in front of which the finger H is placed, regardless of the above-described sensitivity difference. Based on the order of the timings t11, t12, and t13, the arithmetic control circuit 10a detects the moving direction (the rearward swipe) of the finger H in the arrangement direction of the first to third electrodes 16 to 18 (an operation direction detector).

In addition, since the time differentiation values ΔD1 to ΔD3 are, in principle, zero (0) at the peak positions having extreme values, the peak position determination threshold ΔDth may be zero (0). Here, the peak position determination threshold ΔDth is set to a negative number in order to cope with the circumstance where the time differentiation values ΔD1 to ΔD3 of the respective detection data D1 to D3 become zero (0) due to an influence of noise or the like. In other words, by setting the peak position determination threshold ΔDth to a negative number, a possibility that the noise is erroneously detected as the peak positions is reduced.

The foregoing description is also equally applicable to the case where the user keeps the finger H close to the window glass 5 and performs the forward swipe, except that the order of the timings t11, t12, and t13 when the time differentiation values ΔD1 to ΔD3 drop below the peak position determination threshold ΔDth is reversed.

In addition, the time differentiation values ΔD1 to ΔD3 may be actual time differentiation values of the detection data D1 to D3. Alternatively, the time differentiation values ΔD1 to ΔD3 may be obtained, for example, by subtracting, from detection data D1 to D3 in one arithmetic period, detection data D1 to D3 in a previous arithmetic period (e.g., in the last arithmetic period) and dividing the obtained value by a time difference between the arithmetic periods. Alternatively, the time differentiation values ΔD1 to ΔD3 may be obtained, for example, by subtracting, from detection data D1 to D3 in one arithmetic period, detection data D1 to D3 in a previous arithmetic period (e.g., in the last arithmetic period). This is because, when the detection data D1 to D3 are acquired with a certain time difference, the difference among the detection data D1 to D3 includes the time element.

Figure 7:
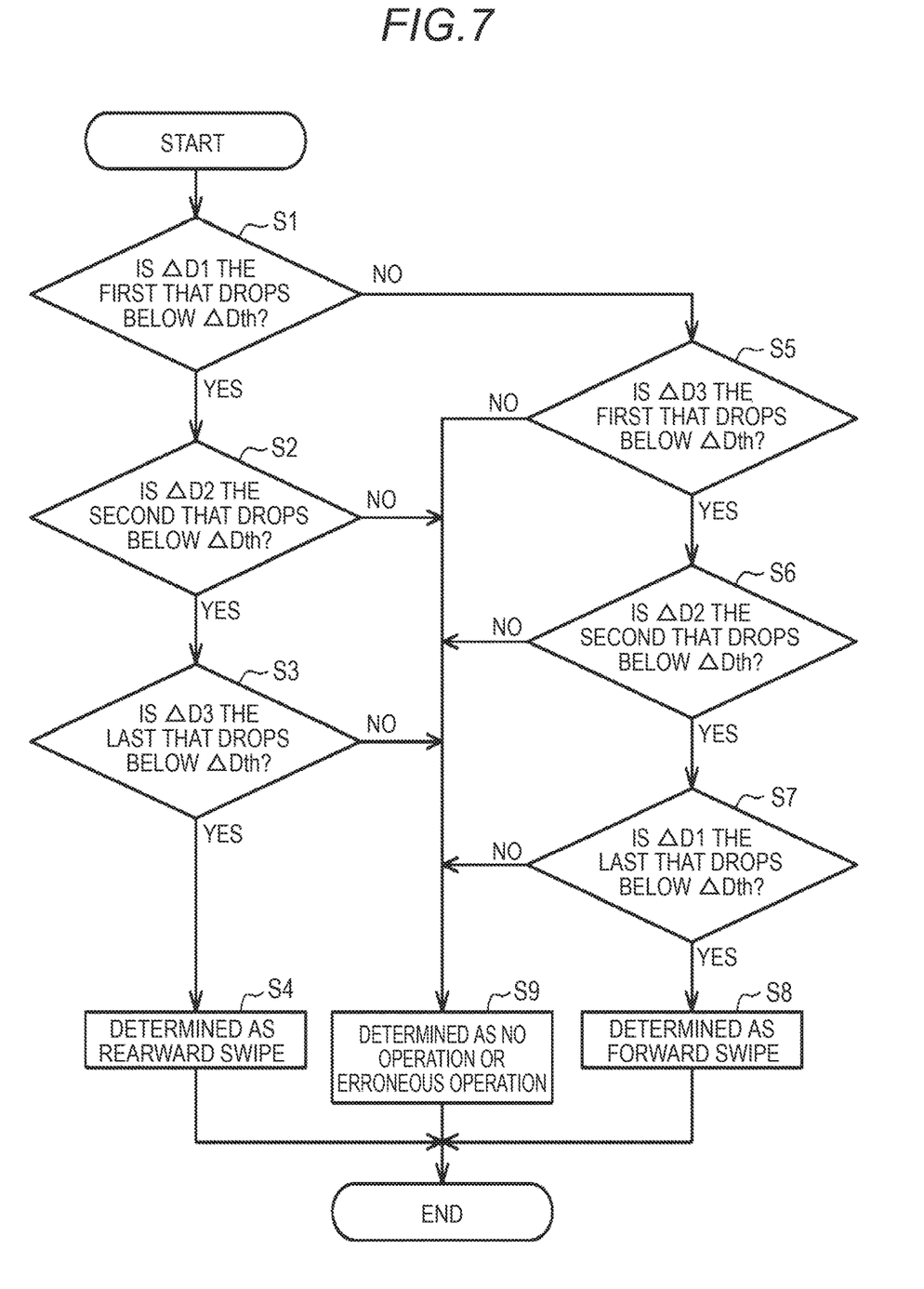
FIG. 7 is a flow chart illustrating an aspect of detecting the operation in the vehicle operation detecting device of the exemplary embodiment.

Next, the detection aspects of the above-described rearward swipe and forward swipe by the arithmetic control circuit 10a will be generally described according to a flow chart. This process is started when it is determined that all the time differentiation values ΔD1 to ΔD3 drop below the peak position determination threshold ΔDth (ΔD1 to ΔD3<ΔDth).

When the process shifts according to the route illustrated in FIG. 7, the arithmetic control circuit 10a determines, in step S1, whether the time differentiation value ΔD1 of the first electrode 16 is the first that drops below the peak position determination threshold ΔDth, that is, whether the timing t11 is the earliest. Here, when it is determined that the time differentiation value ΔD1 of the first electrode 16 is the first that drops below the peak position determination threshold ΔDth, the arithmetic control circuit 10a determines, in step S2, whether the time differentiation value ΔD2 of the second electrode 17 is the second that drops below the peak position determination threshold ΔDth, that is, whether the timing t12 is the second earliest. Then, when it is determined that the time differentiation value ΔD2 of the second electrode 17 is the second that drops below the peak position determination threshold ΔDth, the arithmetic control circuit 10a determines, in step S3, whether the time differentiation value ΔD3 of the third electrode 18 is the last that drops below the peak position determination threshold ΔDth, that is, whether the timing t13 is the latest. Then, when it is determined that the time differentiation value ΔD3 of the third electrode 18 is the last that drops below the peak position determination threshold ΔDth, the arithmetic control circuit 10a determines in step S4 that the rearward swipe is performed and ends the follow-up process.

Meanwhile, when it is determined that the time differentiation value ΔD1 of the first electrode 16 is not the first that drops below the peak position determination threshold ΔDth (NO in step S1), the arithmetic control circuit 10a determines, in step S5, whether the time differentiation value ΔD3 of the third electrode 18 is the first that drops below the peak position determination threshold ΔDth, that is, whether the timing t13 is the earliest. Here, when it is determined that the time differentiation value ΔD3 of the third electrode 18 is the first that drops below the peak position determination threshold ΔDth, the arithmetic control circuit 10a determines, in step S6, whether the time differentiation value ΔD2 of the second electrode 17 is the second that drops below the peak position determination threshold ΔDth, that is, whether the timing t12 is the second earliest. Then, when it is determined that the time differentiation value ΔD2 of the second electrode 17 is the second that drops below the peak position determination threshold ΔDth, the arithmetic control circuit 10a determines, in step S7, whether the time differentiation value ΔD1 of the first electrode 16 is the last that drops below the peak position determination threshold ΔDth, that is, whether the timing t11 is the latest. Then, when it is determined that the time differentiation value ΔD1 of the first electrode 16 is the last that drops below the peak position determination threshold ΔDth, the arithmetic control circuit 10a determines in step S8 that the rearward swipe is performed and ends the follow-up process.

In addition, when it is determined that the time differentiation value ΔD3 of the third electrode 18 is not the first that drops below the peak position determination threshold ΔDth (NO in step S5), the arithmetic control circuit 10a determines in step S9 that there is no operation or an erroneous operation is performed and ends the follow-up process because neither the rearward swipe nor the forward swipe may be performed.

In addition, even when it is determined that the time differentiation value ΔD2 of the second electrode 17 is not the second that drops below the peak position determination threshold ΔDth (NO in step S2 and S6), the arithmetic control circuit 10a similarly determines in step S9 that there is no operation or an erroneous operation is performed and ends the follow-up process. Alternatively, when it is determined that the time differentiation value ΔD3 of the third electrode 18 is not the last that drops below the peak position determination threshold ΔDth (NO in step S3), the arithmetic control circuit 10a similarly determines in step S9 that there is no operation or an erroneous operation is performed and ends the follow-up process. Alternatively, when it is determined that the time differentiation value ΔD1 of the first electrode 16 is not the last that drops below the peak position determination threshold ΔDth (NO in step S7), the arithmetic control circuit 10a similarly determines in step S9 that there is no operation or an erroneous operation is performed and ends the follow-up process.

Then, for example, when it is determined that the rearward swipe is performed, the arithmetic control circuit 10a outputs the control signal C to the driving circuit 10b in order to implement the opening operation of the sliding door 3 and the unlocking operation of the door lock 6 according to the opening operation of the sliding door 3. Alternatively, when it is determined that the forward swipe is performed, the arithmetic control circuit 10a outputs the control signal C to the driving circuit 10b in order to implement the closing operation of the sliding door 3 and the locking operation of the door lock 6 according to the closing operation of the sliding door 3.

Next, the effects of the present exemplary embodiment will be described along with the actions of the present exemplary embodiment.

(1) In the present exemplary embodiment, the order of the plurality of peak positions (the timings t11, t12, and t13) is used for the detection of the rearward or forward swipe (the moving direction of the detection target) by the arithmetic control circuit 10a. Accordingly, even though the sensitivity difference occurs among the first to third electrodes 16 to 18 due to the influence of a product tolerance, an environmental change or the like, the rearward or forward swipe may be more accurately detected.

(2) In the present exemplary embodiment, the peak positions, i.e., the rearward or forward swipe may be detected by the simple method based on the magnitude relationship between each of the time differentiation values ΔD1 to ΔD3 and the peak position determination threshold ΔDth.

(3) In the present exemplary embodiment, since the peak position determination threshold ΔDth is a negative number, the possibility that noise will be erroneously detected as peak positions may be reduced.

In addition, the above-described exemplary embodiment may be modified as follows.

Figure 8:
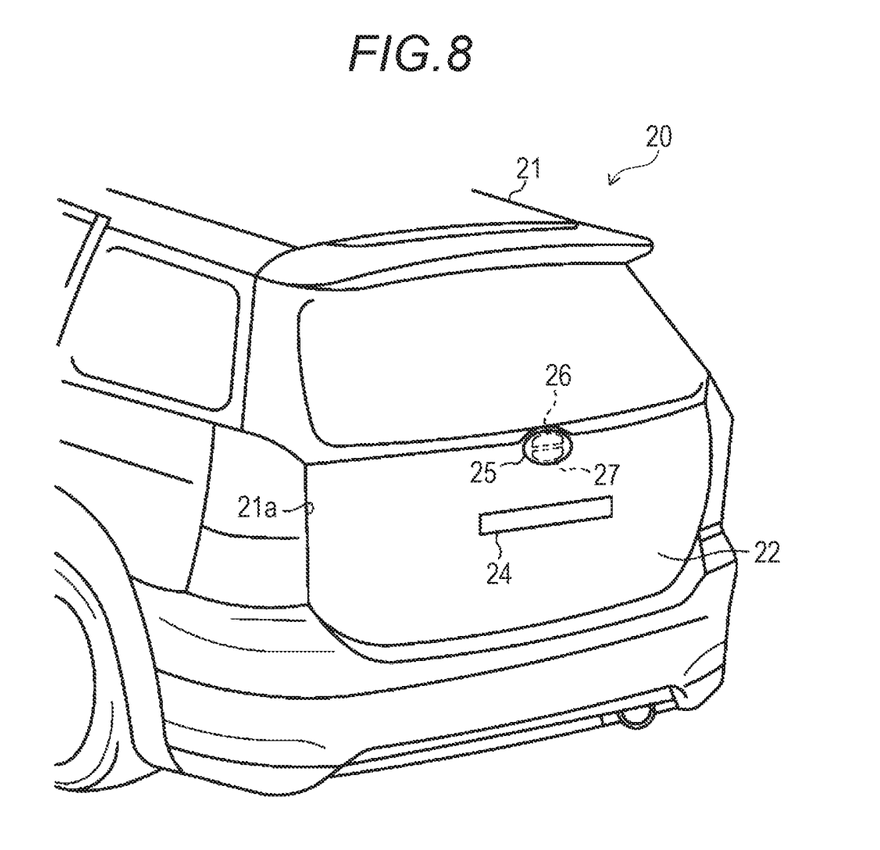
FIG. 8 is a perspective view illustrating a rear side structure of a vehicle to which a modification of the vehicle operation detecting device is applied.

As illustrated in FIG. 8, the vehicle may be a vehicle 20 mounted with a backdoor 22 as an opening/closing member that opens/closes an opening 21a formed on the rear side of the body 21. The backdoor 22 is mounted to be freely opened/closed via a door hinge (not illustrated) formed at the top portion of the opening 21a. The backdoor 22 is opened by being pushed upward around the door hinge.

Figure 9:
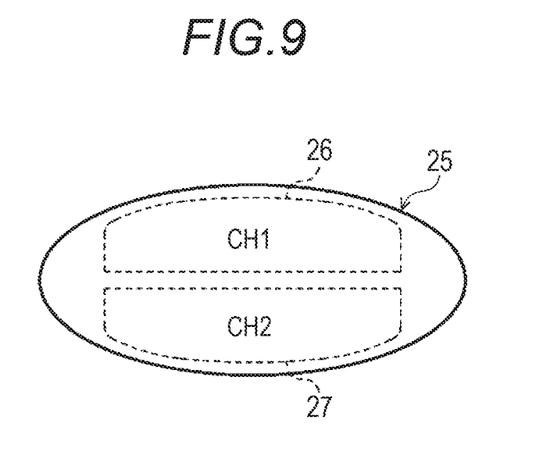
FIG. 9 is a front view illustrating a structure of the vehicle operation detecting device of the modification.

A mark 25 (e.g., a manufacturer name) is provided at the center portion of the outer surface of the backdoor 22 (the center portion above a garnish 24). As illustrated in FIG. 9, an upper electrode 26 and a lower electrode 27 of electrostatic capacitance sensors as a plurality of sensors are installed on the rear side of the mark 25. The upper electrode 26 is disposed on the upper portion of the mark 25 and shaped in a substantially crescent form along the upper edge of the mark 25. Meanwhile, the lower electrode 27 is disposed on the lower portion of the mark 25 and shaped in a substantially crescent form along the lower edge of the mark 25. Of course, the upper electrode 26 and the lower electrode 27 are arranged to be vertically spaced from each other. The upper electrode 26 and the lower electrode 27 output detection signals, respectively, which change as the detection target (e.g., a finger of a person) touches or approaches the mark 25. Accordingly, for example, the process of determining the operation direction (the moving direction of the detection target) is performed based on the above-described exemplary embodiment.

In a regular operation of the present modification, a user (person)'s gesture of moving the finger with respect to the mark 25 indicates an operation to open/close the backdoor 22. That is, a gesture of moving the finger vertically from the lower electrode 27 toward the upper electrode 26 (hereinafter, also referred to as an "upward swipe") indicates an operation to open the backdoor 22. A gesture of moving the finger vertically from the upper electrode 26 toward the lower electrode 27 (hereinafter, also referred to as a "downward swipe") indicates an operation to close the backdoor 22. In addition, the upward swipe may indicate an operation to open the sliding door 3 and unlock the door lock 6 according to the opening of the sliding door 3. Meanwhile, the downward swipe may indicate an operation to close the backdoor 22 and lock the door lock 6 according to the closing of the backdoor 22.

In addition, for example, a reciprocating swipe by the upward swipe and the downward swipe may indicate an operation to set an operation prohibition period. In addition, two-time downward swipes may indicate an operation to set/operate a scheduled lock/door closing. Alternatively, a downward swipe after keeping the finger H at the position of the mark 25 (hereinafter, referred to as a "long touch") may indicate the operation to set/operate a scheduled lock/door closing.

In addition, for example, the backdoor 22 is configured to be opened/closed when the door driving unit 4 and the door lock driving unit 6 are controlled to be driven by the door ECU 10. In this case, since the downward swipe is limited to the operation to close the backdoor 22, that is, the upward swipe is limited to the operation to open the backdoor 22, even when water flowing downward on the mark 25 due to, for example, rainfall is erroneously detected as the downward swipe, at least the opening operation of the backdoor 22 may be avoided.

Figure 10:
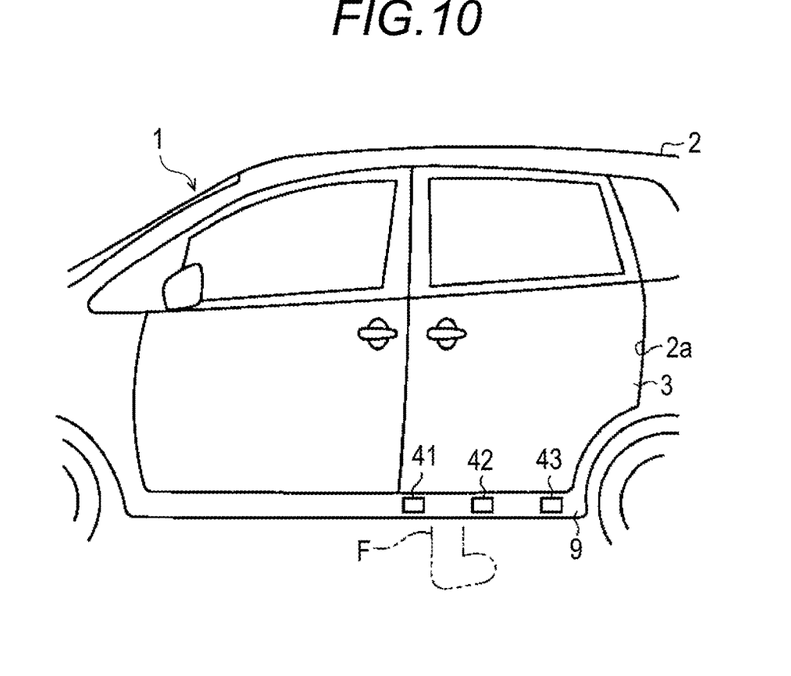
FIG. 10 is a side view illustrating a structure of a vehicle to which a modification of the vehicle operation detecting device is applied.

As illustrated in FIG. 10, when a side skirt (also referred to as a "locker cover") 9 is provided on the lateral side of the body 2 to extend in the front and rear direction along the lower edge of the opening 2a, a plurality of infrared sensors 41, 42, and 43 may be installed on the side skirt 9. In addition, the plurality of infrared sensors 41 to 43 may be installed in a side mudguard (not illustrated) extending in the front and rear direction along the lower edge of the sliding door 3. The infrared sensors 41 to 43 are arranged side by side in this order from the front side toward the rear side. The infrared sensors 41 to 43 output detection signals, respectively, changing as a detection object (e.g., the foot F of a person) touches or approaches the surface of the side skirt 9. Accordingly, for example, the process of determining an operation direction (a moving direction of the detection target) is performed based on the above-described exemplary embodiment.

In a regular operation of the present modification, a user (person)'s gesture of moving the foot F with respect to the side skirt 9 indicates an appropriate operation to open/close the sliding door 3. That is, for example, a gesture of moving the foot F in the front and rear direction toward the rear side (the rearward swipe) indicates the operation to open the sliding door 3 and unlock the door lock 6 according to the opening of the sliding door 3. Meanwhile, a gesture of moving the foot F in the front and rear direction toward the front side (the forward swipe) indicates the operation to close the sliding door 3 and lock the door lock 6 according to the closing of the sliding door 3. In addition, the rearward swipe may indicate only the operation to open the sliding door 3. Likewise, the forward swipe may indicate only the operation to close the sliding door 3.

In addition, for example, a reciprocating swipe by the rearward swipe and the forward swipe may indicate the operation to set an operation prohibition period. In addition, two-time forward swipes may indicate the operation to set/operate a scheduled lock/door closing.

The number of the infrared sensors installed on the side skirt 9 is arbitrary as long as the number is two or more. In addition, the plurality of infrared sensors may be arranged in a vertical row on the side skirt 9. In addition, instead of the plurality of infrared sensors, electrodes of a plurality of electrostatic capacitance sensors or optical sensors such as pyroelectric sensors, ultrasonic wave sensors, and thermosensitive sensors may be adopted.

Figure 11A:
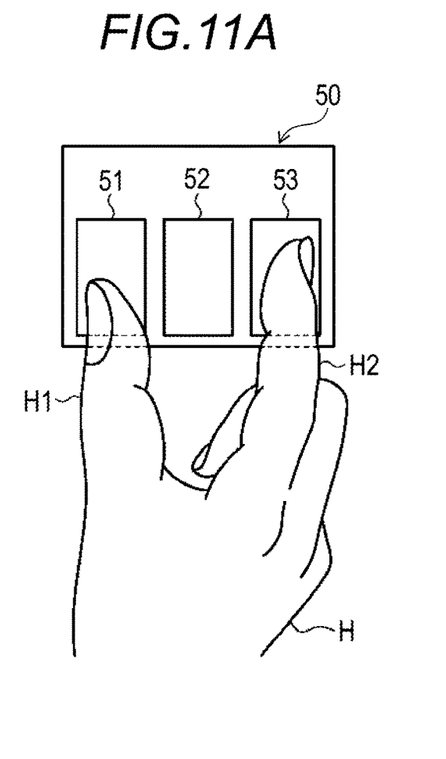
FIGS. 11A and 11B are front views illustrating a structure of the modification of the vehicle operation detecting device.
Figure 11B:
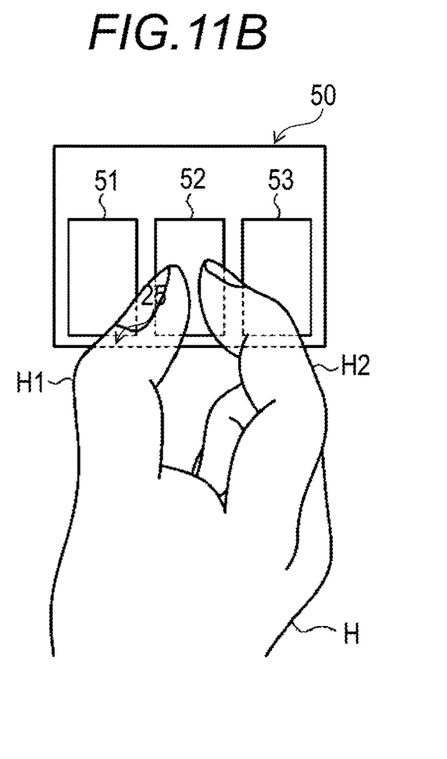

As illustrated in FIGS. 11A and 11B, when an overhead console 50 is mounted as an overhead operation panel inside the vehicle compartment, electrodes 51, 52, and 53 of electrostatic capacitance sensors as a plurality of sensors may be arranged side by side on the overhead console 50. The electrodes 51 to 53 output detection signals, respectively, changing as the detection target (e.g., the finger H of a person) touches or approaches the surface of the overhead console 50. Accordingly, for example, the process of determining an operation direction (a moving direction of the detection target) is performed based on the above-described exemplary embodiment.

In a regular operation of the present modification, a user (person)'s gesture of moving the finger H with respect to the overhead console 50 indicates an appropriate operation to open/close a sunroof (not illustrated) mounted on the roof. That is, a gesture of moving one finger (e.g., the thumb) H1 from the center electrode 52 toward the left electrode 51 and simultaneously moving the other finger (e.g., the forefinger) H2 from the center electrode 52 toward the right electrode 53, so-called unpinching to open the fingers H1 and H2 indicates the operation to open the sunroof. In addition, a gesture of moving one finger H1 from the left electrode 51 toward the center electrode 52 and simultaneously moving the other finger H2 from the right electrode 53 toward the center electrode 52, so-called pinching to close the fingers H1 and H2 indicates the operation to close the sunroof.

In addition, the sunroof is opened/closed when the door driving unit 4 is controlled to be driven by the door ECU 10.

Figure 12:
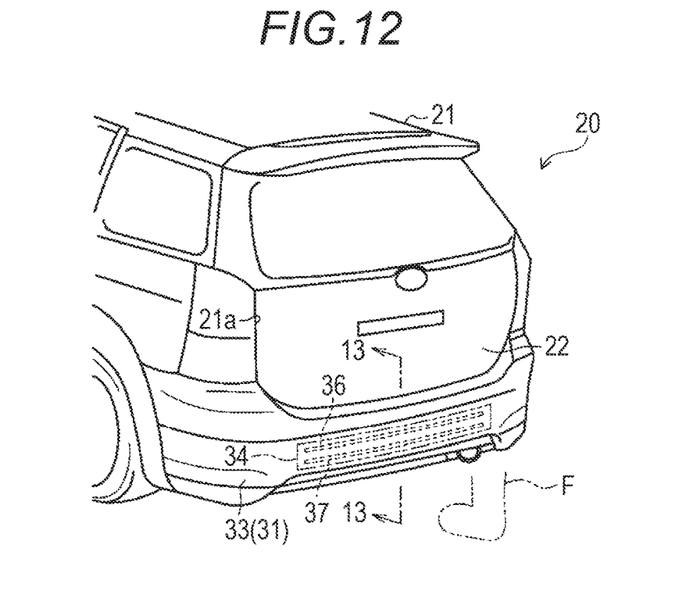
FIG. 12 is a perspective view illustrating a rear side structure of a vehicle to which a modification of the vehicle operation detecting device is applied.
Figure 13:
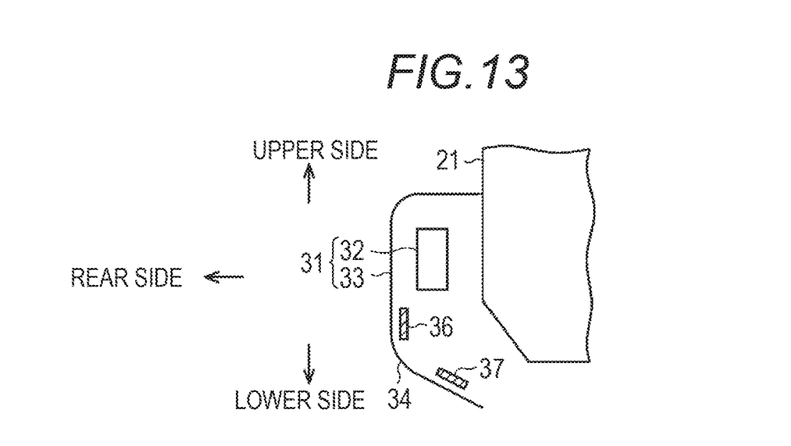
FIG. 13 is a sectional view taken along the line 13-13 of FIG. 12.

As illustrated in FIG. 12, when a rear bumper 31 is mounted on the rear side of the body 21 to extend in the width direction of the vehicle below the backdoor 22, a plurality of sensors installed on the rear bumper 31 may be an upper electrode 36 and a lower electrode 37 of electrostatic capacitance sensors. That is, as illustrated in FIG. 13, the rear bumper 31 includes, for example, a metal-made reinforcement 32 and a resin-made bumper cover 33. The reinforcement 32 has a substantially elongated shape extending in the width direction of the vehicle over the substantially entire length of the rear bumper 31. The bumper cover 33 covers the entire reinforcement 32 from the rear side of the reinforcement 32.

As illustrated in FIG. 12, each of the upper electrode 36 and the lower electrode 37 has a substantially belt shape extending in the width direction of the vehicle over the substantially entire length of the rear bumper 31, and the electrodes have substantially the same shape. In addition, the lower electrode 37 is disposed below the upper electrode 36 at a substantially constant interval. In addition, a substantially rectangular operation input unit 34 is formed on the (outer) surface of the bumper cover 33 to include the upper and lower electrodes 36 and 37. The upper electrode 36 and the lower electrode 37 output detection signals that change as the detection target (e.g., the foot F of a person) touches or approaches the operation input unit 34. Accordingly, for example, the process of determining an operation direction (a moving direction of the detection target) is performed based on the above-described exemplary embodiment.

In addition, the number of the sensor electrodes installed in the operation input unit 34 is arbitrary as long as the number is two or more. Alternatively, the sensor electrodes installed in the operation input unit 34 may be a plurality of sensor electrodes arranged in the width direction of the vehicle at intervals. In addition, instead of the plurality of sensor electrodes, for example, infrared sensors, optical sensors such as pyroelectric sensors, ultrasonic wave sensors, and thermosensitive sensors may be adopted. In a regular operation of the present modification, a user (person)'s gesture of moving the foot F with respect to the rear bumper 31 (the operation input unit 34) indicates an appropriate operation to open/close the backdoor 22.

In the above-described exemplary embodiment, it may be determined whether all the plurality of detection data D1 to D3 exceed a predetermined threshold (a determination unit), and when it is determined that all the detection data D1 to D3 exceed the predetermined threshold, the detection of the operation direction (the moving direction of the detection target) may be performed based on the time differentiation values ΔD1 to ΔD3 (the order of the peak positions). In addition, the thresholds for the plurality of detection data D1 to D3 may be the same or different from each other depending on the sensitivities of the first to third electrodes 16 to 18.

With this change, since the order of the plurality of peak positions for the detection of the operation direction is determined based on the plurality of detection data D1 to D3 exceeding a predetermined threshold to ensure a sufficient signal/noise (S/N) ratio, the detection accuracy of the operation direction may be further improved.

In the above-described exemplary embodiment, a speed (a moving speed of the detection target) of the swipe (the rearward or forward swipe) may be detected based on the time difference among the plurality of peak positions (an operation speed detector). That is, as can be seen from FIGS. 6A and 6B, in a relatively slow swipe, the time difference between adjacent peak positions naturally becomes long. Meanwhile, in a relatively fast swipe, the time difference between adjacent peak positions naturally becomes short. Accordingly, the speed of the swipe (the rearward or forward swipe) may be detected based on the time difference among the plurality of peak positions.

Here, the relatively slow swipe may indicate an operation to open/close the sliding door 3 at a relatively slow driving speed, and the relatively fast swipe may indicate an operation to open/close the sliding door 3 at a relatively fast driving speed. In this case, the arithmetic control circuit 10a controls the driving speed (an opening/closing operation speed) of the sliding door 3 according to the detected speed of the swipe (a driving controller). That is, when the detected speed of the swipe is relatively fast, the arithmetic control circuit 10a outputs the control signal C to the driving circuit 10b to open/close the sliding door 3 at the relatively fast driving speed. Accordingly, the driving speed of the sliding door 3 may be changed by changing the speed of the swipe.

In addition, the driving speed of the sliding door 3 may be linearly changed according to the speed of the swipe. Alternatively, the driving speed of the sliding door 3 may be divided into a plurality of groups according to the speed of the swipe, and changed step by step according to the groups to which the divided speeds belong.

In the above-described exemplary embodiment, the peak position determination threshold ΔDth may be zero (0).

In the above-described exemplary embodiment, for example, an arithmetic process for a ratio value Ra is performed using the detection data D1 and D2 obtained by the ND conversion of the detection signals S1 and S2. However, for example, the arithmetic process for the ratio value Ra may be performed in an analogue manner using the detection signals S1 and S2 as they are.

In the above-described exemplary embodiment, the sensor body 15 may be equipped inside the belt molding 8.

In the above-described exemplary embodiment, the arrangement of the plurality of sensors is arbitrary as long as the sensors are arranged side by side at a position that does not cause any inconvenience in the user's operation, in the vehicle. For example, when an operation target is the backdoor 22, the sensors may be arranged on the surface of the garnish 24. When the operation target is the sliding door 3, the sensors may be arranged on the surface of a pillar or an outside door handle. In sum, the plurality of sensors may be arranged depending on an assumed detection target.

In the above-described exemplary embodiment, the rearward swipe may indicate only the operation to open the sliding door 3. Likewise, the forward swipe may indicate only the operation to close the sliding door 3.

In addition, for example, a reciprocating swipe by the rearward swipe and the forward swipe may indicate the operation to set the operation prohibition period. In addition, two-time forward swipes may indicate the operation to set/operate a scheduled lock/door closing.

In addition, when a gesture other than a predetermined operation is detected, the possibility of an erroneous operation may be further reduced by, for example, deactivating the device or performing a necessary prohibition process.

In the above-described exemplary embodiment, the number of the sensor electrodes included in the sensor body 15 is arbitrary as long as the number is two or more. Alternatively, the sensor electrodes included in the sensor body 15 may be a plurality of sensor electrodes arranged to be vertically spaced from each other.

In the above-described exemplary embodiment, the sensors may be, for example, infrared sensors, optical sensors such as pyroelectric sensors, ultrasonic wave sensors, and thermosensitive sensors as long as the sensors may output the detection signals changing as the detection target touches or approaches the sensors.

In the above-described exemplary embodiment, the operation target for opening/closing (the opening/closing member) may be, for example, the window glass 5 (a window regulator), a swing door, a bonnet, a trunk lid, or a fuel lid. Alternatively, the operation target may be, for example, a rotatable seat for supporting an upward and downward movement or an upwardly and downwardly movable seat.

A vehicle operation detecting device according to an aspect of this disclosure includes: a plurality of sensors that are arranged side by side in a vehicle and individually output a plurality of detection signals changing as a detection target touches or approaches the plurality of sensors; a peak position detector that detects peak positions of the plurality of detection signals; an operation direction detector that detects a moving direction of the detection target in the arrangement direction of the plurality of sensors, based on an order of the peak positions; and a driving controller that controls a driving of an opening/closing member along the detected moving direction.

In general, even when the sensitivity difference occurs among the plurality of sensors due to an influence of a product tolerance, an environment change or the like, the detection signal of each of the sensors tends to become the largest when the detection target is placed in front of the corresponding sensor. In other words, an order of timings when the detection signals of the plurality of sensors become the largest (i.e., peak positions) is consistent with the order of the plurality of sensors in front of which the detection target is placed. According to this configuration, since the moving direction of the detection target is detected using the order of the plurality of peak positions by the operation direction detector, the moving direction of the detection target may be more accurately detected even when the sensitivity difference occurs among the plurality of sensors due to an influence of a product tolerance, an environment change or the like.

In the vehicle operation detecting device, it is preferable that the peak position detector detects timings when time differentiation values of the plurality of respective detection signals drop below a predetermined peak position determination threshold, as the peak positions.

According to this configuration, the peak positions, i.e., the moving direction of the detection target may be detected by a simple method based on the magnitude relationship between each of the time differentiation values and the peak position determination threshold.

In the vehicle operation detecting device, it is preferable that the peak position determination threshold is a negative number.

In general, the time differentiation value of each detection signal may become zero (0) due to an influence of noise or the like. According to this configuration, since the peak position determination threshold is a negative number, a possibility that the noise will be erroneously detected as the peak positions may be reduced.

It is preferable that the vehicle operation detecting device further includes a determination unit that determines whether all the plurality of the detection signals exceed a predetermined threshold, in which, when it is determined by the determination unit that all the plurality of detection signals exceed the predetermined value, the operation direction detector detects a moving direction of the detection target, based on the order of the peak positions.

It is preferable that the vehicle operation detecting device further includes an operation speed detector that detects a moving speed of the detection target, based on a time difference among the peak positions, in which the driving controller controls a driving speed of the opening/closing member according to the moving speed detected by the operation speed detector.

In the vehicle operation detecting device, it is preferable that the plurality of sensors are arranged side by side in a front and rear direction of the vehicle on a door panel provided on a lateral side of the vehicle.

In the vehicle operation detecting device, it is preferable that the plurality of sensors include three sensors having the same shape.

In the vehicle operation detecting device, it is preferable that the plurality of sensors are arranged in a vertical direction of the vehicle on the opening/closing member provided on a rear side of the vehicle.

In the vehicle operation detecting device, it is preferable that the plurality of sensors are arranged on a mark provided on a center portion of the opening/closing member provided on a rear side of the vehicle.

In the vehicle operation detecting device, it is preferable that the plurality of sensors are arranged side by side in a front and rear direction of the vehicle along a lower edge of an opening in which a door panel is provided, on a lateral side of the vehicle.

In the vehicle operation detecting device, it is preferable that the plurality of sensors are an electrostatic capacitance sensor.

In the vehicle operation detecting device, it is preferable that the plurality of sensors are an infrared sensor.

This aspect of disclosure achieves an effect on further improving the detection accuracy of an operation of the opening/closing member.

Next, the technical concept grasped from the above-described exemplary embodiment and modifications will be additionally described.

(a) The above-described vehicle operation detecting device includes the determination unit that determines whether all the plurality of detection signals exceed a predetermined threshold, and when it is determined by the determination unit that all the plurality of detection signals exceed the predetermined threshold, the operation direction detector detects the moving direction of the detection target based on the order of the plurality of peak positions.

According to this configuration, since the order of the plurality of peak positions for the detection of the moving direction of the detection target is determined based on the plurality of detection signals all exceeding the predetermined threshold to ensure a sufficient signal/noise (S/N) ratio, the detection accuracy of the moving direction of the detection target may be further improved.

(b) The above-described vehicle operation detecting device includes the operation speed detector that detects a moving speed of the detection target based on the time difference among the plurality of peak positions, and the driving controller controls the driving speed of the opening/closing member according to the detected moving speed.

According to this configuration, the driving speed of the opening/closing member may be changed by changing the moving speed of the detection target.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle operation detecting device comprising:
   a plurality of sensors that are arranged side by side in a vehicle and individually output a plurality of detection signals changing as a detection target touches or approaches the sensors;
   a peak position detector that detects a plurality of peak positions of the plurality of detection signals;
   an operation direction detector that detects a moving direction of the detection target in an arrangement direction of the plurality of sensors, based on an order of the plurality of peak positions; and
   a driving controller that controls a driving of an opening/closing member according to the detected moving direction, and
   wherein the peak position detector detects timings when time differentiation values of the respective detection signals drop below a predetermined peak position determination threshold, as the peak positions, and
   wherein the peak position determination threshold is a negative number.

2. The vehicle operation detecting device according to claim 1, further comprising:
   a determination unit that determines whether all the plurality of the detection signals exceed a predetermined threshold, wherein, when it is determined by the determination unit that all the plurality of detection signals exceed the predetermined value, the operation direction detector detects a moving direction of the detection target, based on the order of the peak positions.

3. The vehicle operation detecting device according to claim 1, further comprising:
an operation speed detector that detects a moving speed of the detection target, based on a time difference among the peak positions,
wherein the driving controller controls a driving speed of the opening/closing member according to the moving speed detected by the operation speed detector.

4. The vehicle operation detecting device according to claim 1, wherein the plurality of sensors include three sensors having the same shape.

5. The vehicle operation detecting device according to claim 1, wherein the plurality of sensors are arranged side by side in a vertical direction of the vehicle on the opening/closing member provided on a rear side of the vehicle.

6. The vehicle operation detecting device according to claim 5, wherein the plurality of sensors are arranged on a mark provided on a center portion of the opening/closing member provided on a rear side of the vehicle.

7. The vehicle operation detecting device according to claim 1, wherein the plurality of sensors are arranged side by side in a front and rear direction of the vehicle along a lower edge of an opening in which a door panel is provided, on a lateral side of the vehicle.

8. The vehicle operation detecting device according to claim 1, wherein the plurality of sensors are an electrostatic capacitance sensor.

9. The vehicle operation detecting device according to claim 1, wherein the plurality of sensors are an infrared sensor.

10. A vehicle operation detecting device, comprising:
a plurality of sensors that are arranged side by side in a vehicle and individually output a plurality of detection signals changing as a detection target touches or approaches the sensors;
a peak position detector that detects a plurality of peak positions of the plurality of detection signals;
an operation direction detector that detects a moving direction of the detection target in an arrangement direction of the plurality of sensors, based on an order of the plurality of peak positions; and
a driving controller that controls a driving of an opening/closing member according to the detected moving direction,
wherein the plurality of sensors are arranged side by side in a front and rear direction of the vehicle on a door panel provided on a lateral side of the vehicle.

* * * * *